US008407881B2

(12) United States Patent
Naganawa et al.

(10) Patent No.: US 8,407,881 B2
(45) Date of Patent: Apr. 2, 2013

(54) PROCESS OF MANUFACTURING A STATOR

(75) Inventors: Takashi Naganawa, Kasumigaura (JP);
Kenji Miyata, Hitachinaka (JP);
Takashi Ishigami, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 441 days.

(21) Appl. No.: 12/698,712

(22) Filed: Feb. 2, 2010

(65) Prior Publication Data

US 2010/0194230 A1 Aug. 5, 2010

(30) Foreign Application Priority Data

Feb. 3, 2009 (JP) ................................ 2009-022098

(51) Int. Cl.
*H02K 15/00* (2006.01)
(52) U.S. Cl. ................. 29/596; 29/598; 29/605; 29/606
(58) Field of Classification Search .................... 29/596, 29/598, 605, 606, 732, 734–736; 310/184, 310/195, 208
See application file for complete search history.

(56) References Cited

U.S. PATENT DOCUMENTS

| 5,691,590 | A | 11/1997 | Kawai et al. |
| 5,708,316 | A | 1/1998 | Ishida |
| 7,185,413 | B2 * | 3/2007 | Kuroyanagi et al. ........... 29/596 |
| 2010/0231082 | A1 * | 9/2010 | Bodin et al. .................. 310/195 |

FOREIGN PATENT DOCUMENTS

JP 6-165422 A 6/1994

* cited by examiner

*Primary Examiner* — Thiem Phan
(74) *Attorney, Agent, or Firm* — Crowell & Moring LLP

(57) ABSTRACT

An object of the present invention is to provide a small, high-power rotating electrical machine by suitably forming a distributed winding coil such that two stator magnetic poles each formed of in-phase coil turns are arranged within an electric angle of 360 degrees formed by magnetic poles of the rotor. The present invention provides a method for manufacturing a stator, the method including a first step of placing a distributed winding coil 207 composed of a wire wound around a reel 210, as a whole, inside a stator core 202, and a second step of moving an insertion blade 213 so as to spread the distributed winding coil 207 in the radial direction of the stator core 202, thus inserting the distributed winding coil 207 into a stator core slot 206.

2 Claims, 12 Drawing Sheets (A)

(B)

(A)

(B)

(A)

(B)

(A)

(B)

(A)

(B)

PROCESS OF MANUFACTURING A STATOR

BACKGROUND OF THE INVENTION

1. Field of the Invention

The present invention relates to a process of manufacture and a manufacturing device of a stator.

2. Background Art

As the structure of a stator coil in a rotating electrical machine, distributed winding, concentrated winding, and the like are known. In particular, a winding structure is known which comprises a first three-phase connection coil obtained by three-phase-connecting three stator coils short-pitch lap-wound around teeth of a stator core at a pitch shorter than the magnetic pole pitch of a rotator, and a second three-phase connection coil obtained by three-phase-connecting three stator coils together which are short-pitch lap-wound around teeth of a stator core at a short pitch so that each of the stator coils is displaced from the corresponding one of the stator coils of the first three-phase connection coil by an electric angle of π/3 radians, the three stator coils being connected together in the same manner as that for the first three-phase connection coil (see JP Patent Publication (Kokai) No. 6-165422 (1994)).

In view of the recent energy issue, there has been a demand for the high-efficiency of rotating electrical machines. However, the above-described technique is in principle based on concentrated winding. Thus, the stator coil for one phase utilizes only a region of an interlinkage magnetic flux from the rotator which corresponds to an electric angle of 120 degrees. Hence, it has been increasingly difficult to increase the efficiency of the concentrated winding, compared to that of the distributed winding, which utilizes a region of the interlinkage magnetic flux corresponding to an electric angle of 360 degrees.

On the other hand, the distributed winding includes full pitch winding and short pitch winding. Both in the full pitch winding and in the short pitch winding, the coils for all the phases are wound around the teeth of the stator by winding the coils in one direction through an electric angle of substantially 180 degrees and then in the opposite direction through the remaining 180 degrees. This increases the interlinkage magnetic flux amount by which each coil is interlinked with a magnetic flux whose reaction is caused by a current flowing through the coil. Hence, the inductance of the coil has a relatively large value. Thus, in a dynamo, a generation current is suppressed in a high-speed rotation region. In a motor, the control responsiveness of the coil current is degraded.

The present invention provides a process of manufacture and a manufacturing device which are preferable for a small, high-power rotating electrical machine in which the coils are wound such that two stator magnetic poles each formed of in-phase coil turns are arranged within an electric angle of 360 degrees formed by magnetic poles of the rotor.

SUMMARY OF THE INVENTION

A stator is formed as follows. A conductor wire with an insulating film (hereinafter referred to as a wire) is wound around a circular reel. The coil wound around the reel as a whole is placed inside a core of a stator. Only the coil is inserted into a core slot in the stator.

The present invention allows the productivity of a rotating electrical machine to be improved.

DESCRIPTION OF SYMBOLS

Figure 1:
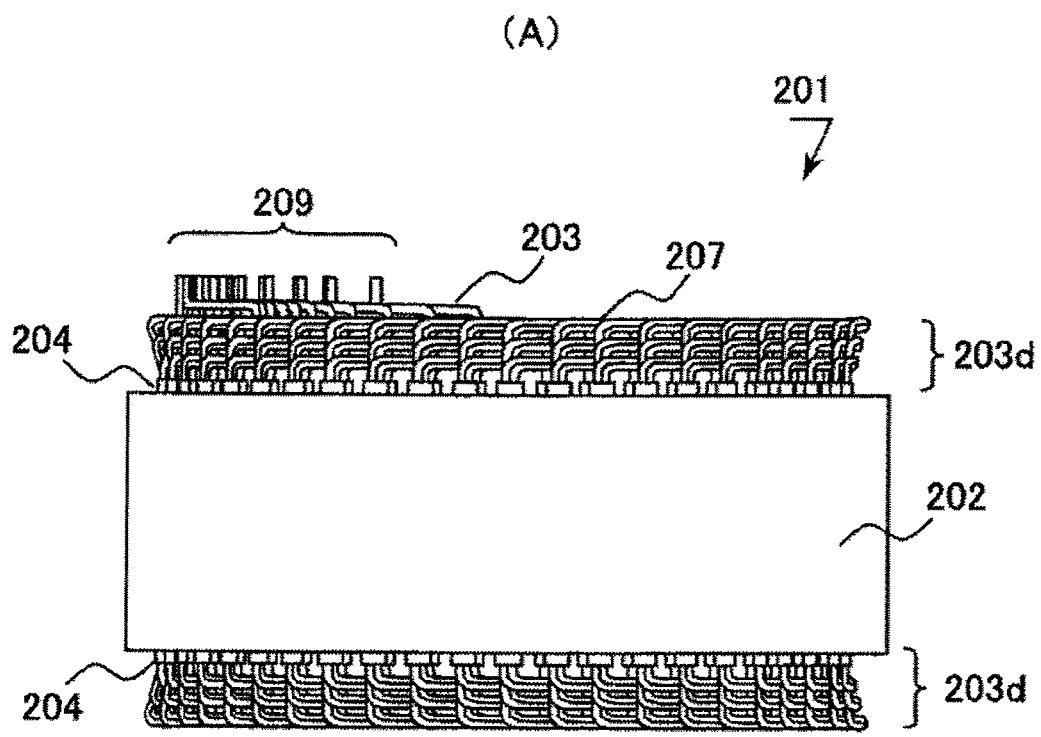
FIG. 1 is a front view of a rotating electrical machine according to an embodiment of the present invention.
Figure 1:
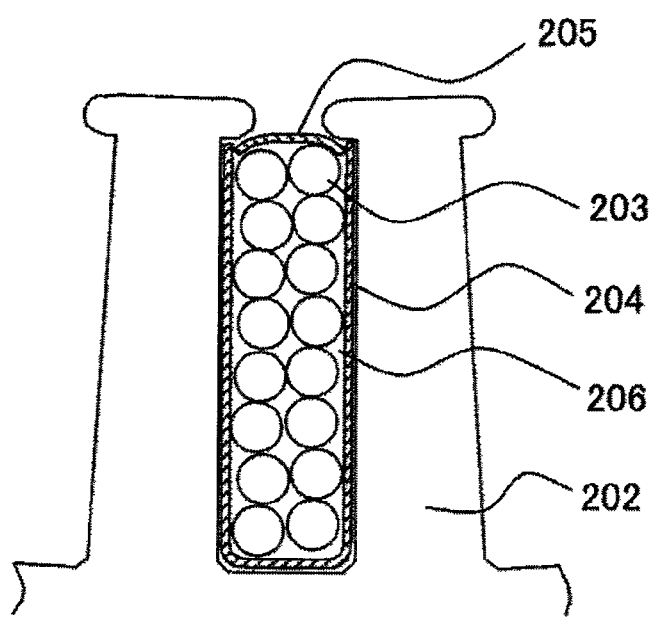

201 Stator
202 Stator core
203 Wire
204 Insulant
205 Wedge
206 Stator core slot
207 Distributed winding coil
210 Reel
211 Winding wire protruding portion
212 Winding wire pin
213 Insertion blade

DETAILED DESCRIPTION OF PREFERRED EMBODIMENTS

The present invention will be described below with reference to the drawings.

FIG. 1 is a front view of a rotating electrical machine according to an embodiment of the present invention.

A coil is wound around a stator 201 such that two stator magnetic poles each formed of in-phase coil turns are arranged within an electric angle of 360 degrees formed by magnetic poles of a rotor. A coil thus formed is hereinafter referred to as a distributed winding coil 207.

FIG. 1(A) is a front view of the stator 201 as seen from the side surface of a stator core 2. The distributed winding coils 207 are integrated into the stator core 202. Terminal portions 209 of wires 203 are connected to the distributed winding coils 207. In this structure, a coil end portion 203*d* has a reduced height.

FIG. 1(B) is a sectional view in which the inside of a stator core slot 206 in the stator core 202 is shown enlarged. The stator core 202 is formed by punching and building up a silicon steel plate of thickness about 0.35 mm. The wire 203 is a conductor wire coated with an insulator. In the present embodiment, a conductor made of copper is coated with polyamideimide resin. Wires wrapped with insulants are arranged in the stator core slot 206 in the stator core 202. Wrapping each wire 203 with the insulant 204 improves the insulating property. Wrapping the coil wire 203 with the insulant 204 serves to insulate the coil wire 203 from possible pin holes in enamel coating that covers the coil wire 203 and to prevent the enamel coating from bring damaged during integration of the coil wire 203 into the stator core. Moreover, a wedge 205 is installed in the stator core 202 to allow the inner circumference face of the core to be more reliably insulated. The wire 203 in FIG. 1(B) is a round wire with a circular cross section. Sixteen wires 203 are arranged in the stator core slot 206 in the stator core 202 in the axial direction.

Then, a motor or a dynamo is constructed by coaxially integrating a magnetic rotor (not shown in the drawings) or a basket-shaped copper rotor (not shown in the drawings) into the stator 201, and using bearings to rotatably support the opposite ends of the rotor.

A method for manufacturing a distributed winding coil and a method for assembling the distributed winding coil will be described with reference to FIG. 2 to FIG. 6. In FIG. 2 to FIG. 6, for description, the number of wound wires is reduced for simplification.

Figure 2:
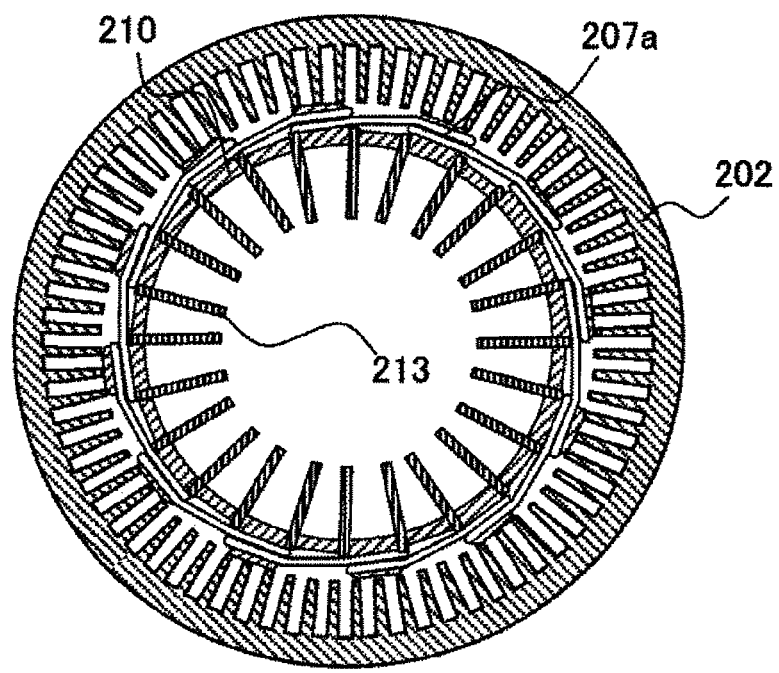
FIG. 2 is a diagram showing a step of assembling the first phase of a distributed winding coil according to the embodiment of the present invention.
Figure 2:
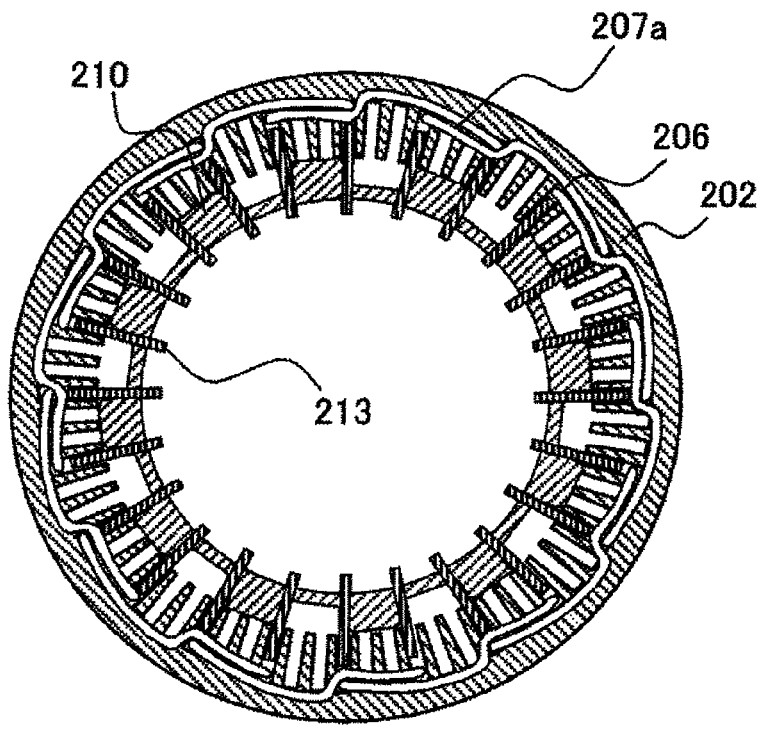

FIG. 2 shows how the distributed winding coil 207a for the first phase is assembled in the core. FIG. 2(A) shows that the distributed winding coil 207a comprising the wire distributively wound around a reel 210, as a whole, is placed inside the stator core 202. FIG. 2(B) shows that insertion blades 213 are moved so as to spread the distributed winding coil 207a in the radial direction of the stator core 202, thus inserting the distributed winding coil 207a into the stator core slot 206.

Figure 3:
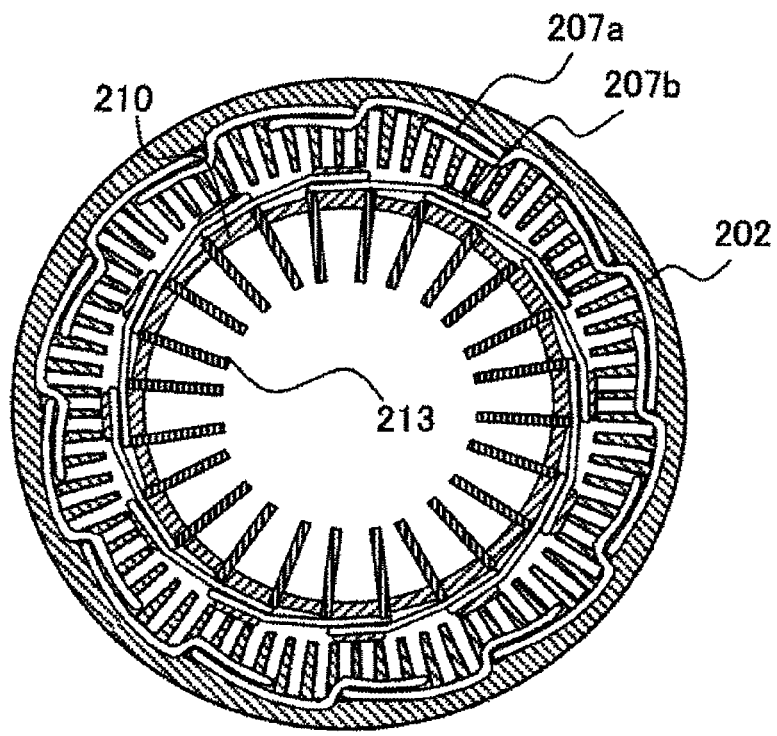
FIG. 3 is a diagram showing a step of assembling the second phase of a distributed winding coil according to the embodiment of the present invention.
Figure 3:
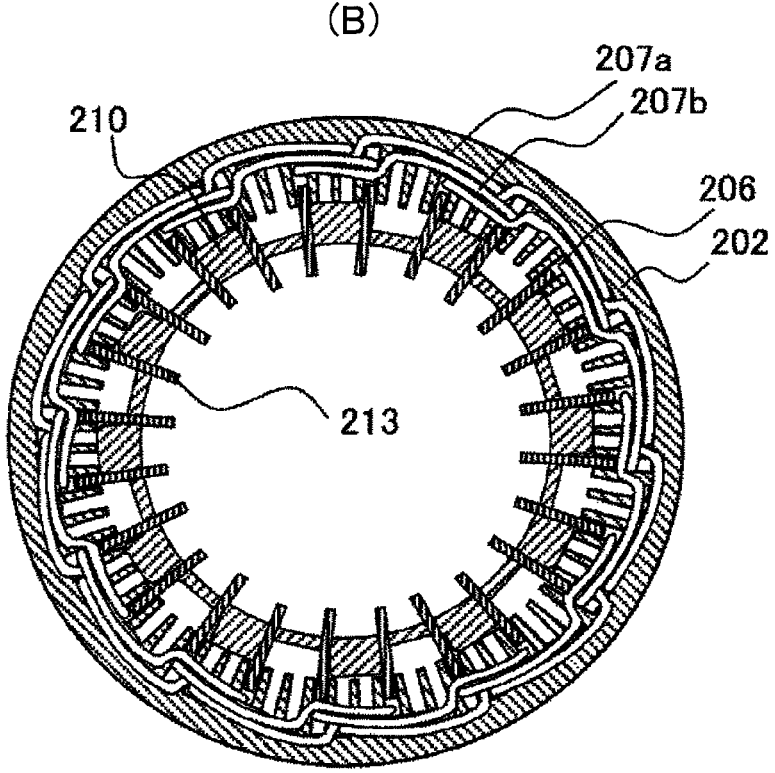

FIG. 3 shows how after the assembly of the distributed winding coil 207a for the first phase, a distributed winding coil 207b for the second phase is assembled in the core. FIG. 3(A) shows that the coil 207b comprising the wire distributively wound around the reel 210, as a whole, is placed inside the stator core 202. FIG. 3(B) shows that the distributed winding coil 207b is inserted into the stator core slot 206 by moving the insertion blades 213 so as to spread the already inserted distributed winding coil 207a in the radial direction of the stator core 202 to press the distributed winding coil 207a in the radial direction.

Figure 4:
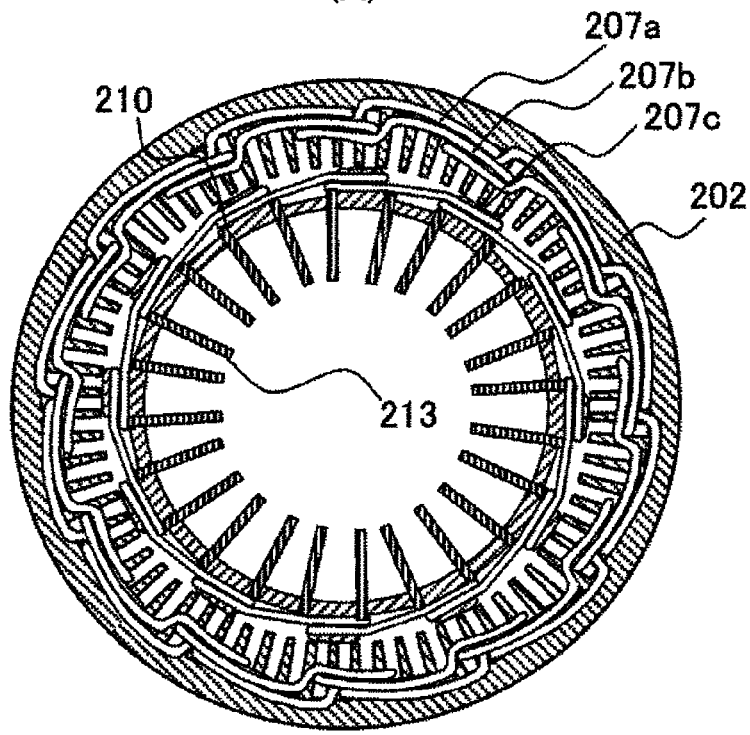
FIG. 4 is a diagram showing a step of assembling the third phase of a distributed winding coil according to the embodiment of the present invention.
Figure 4:
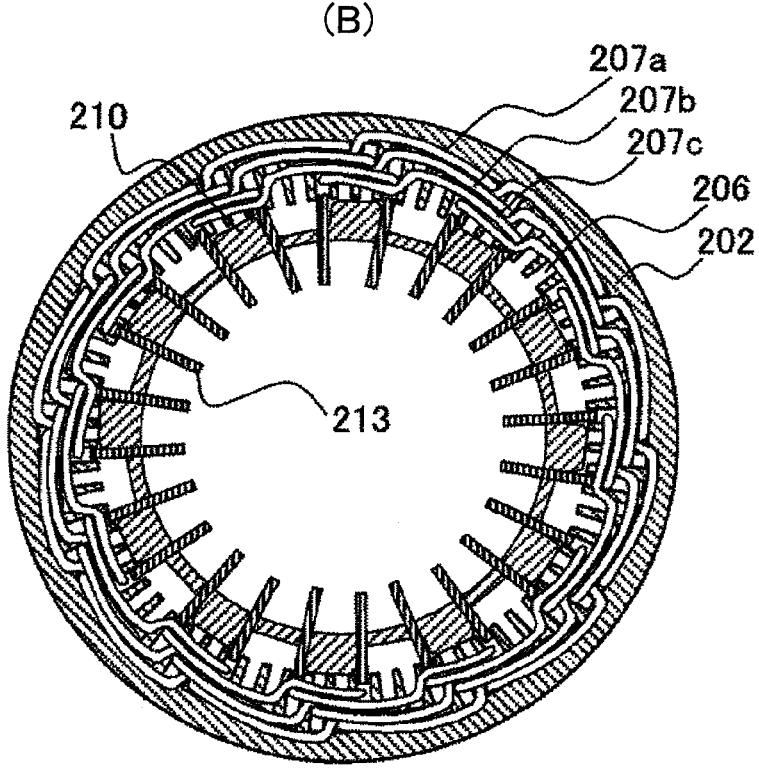

FIG. 4 shows how after the assembly of the distributed winding coil 207a for the first phase and the distributed winding coil 207b for the second phase in the core, a distributed winding coil 207c for the third phase is assembled in the core. FIG. 4(A) shows that the coil 207c comprising the wire distributively wound around the reel 210, as a whole, is placed inside the stator core 202. FIG. 4(B) shows that the distributed winding coil 207c is inserted into the stator core slot 206 by moving the insertion blades 213 so as to spread the distributed winding coil 207c in the radial direction of the stator core 202 to press the distributed winding coils 207a and 207b in the radial direction.

Figure 5:
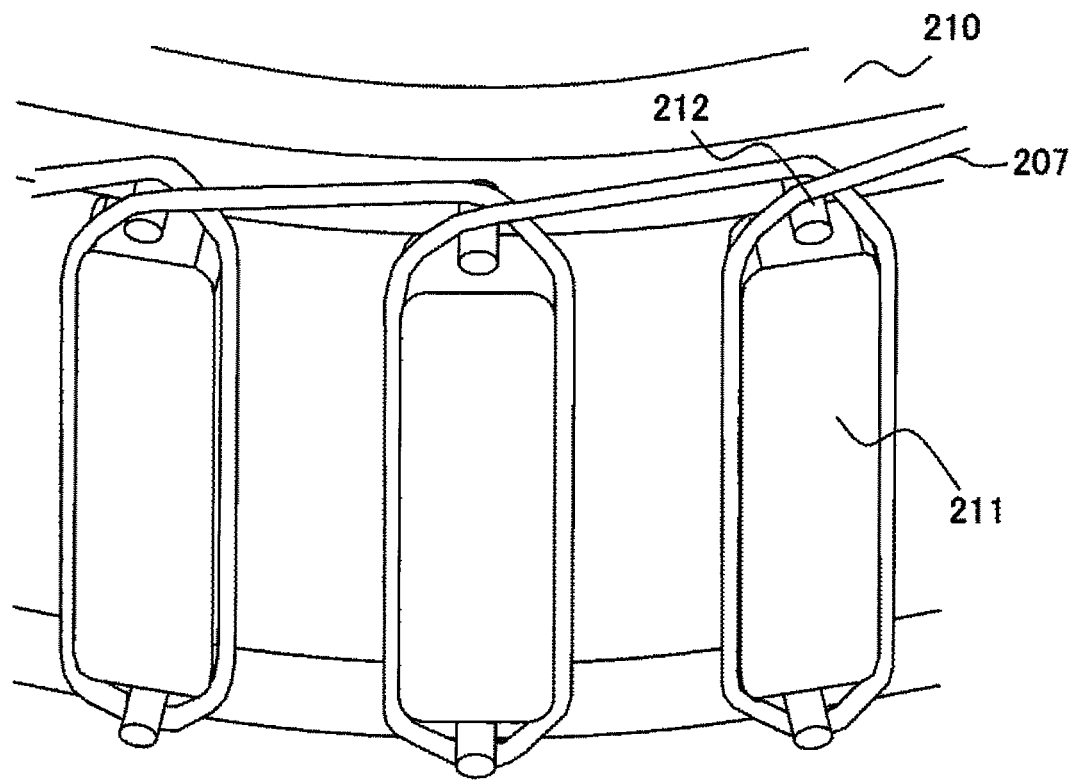
FIG. 5 is a perspective view of a reel around which the distributed winding coil according to the embodiment of the present invention is wound.

FIG. 5 is a partly enlarged perspective view of the reel 210. Winding wire protruding portions 211 are circumferentially arranged on the reel 210. A winding wire pin 212 is arranged over and under each of the winding wire protruding portions. A wire is wound around each of the winding wire protruding portions 211 and each of the winding wire pins 212 so as to form the distributed winding coil 207. This operation is repeated as shown in FIG. 2 to FIG. 4 to assemble a predetermined number of coils for predetermined phases to form a stator.

Figure 6:
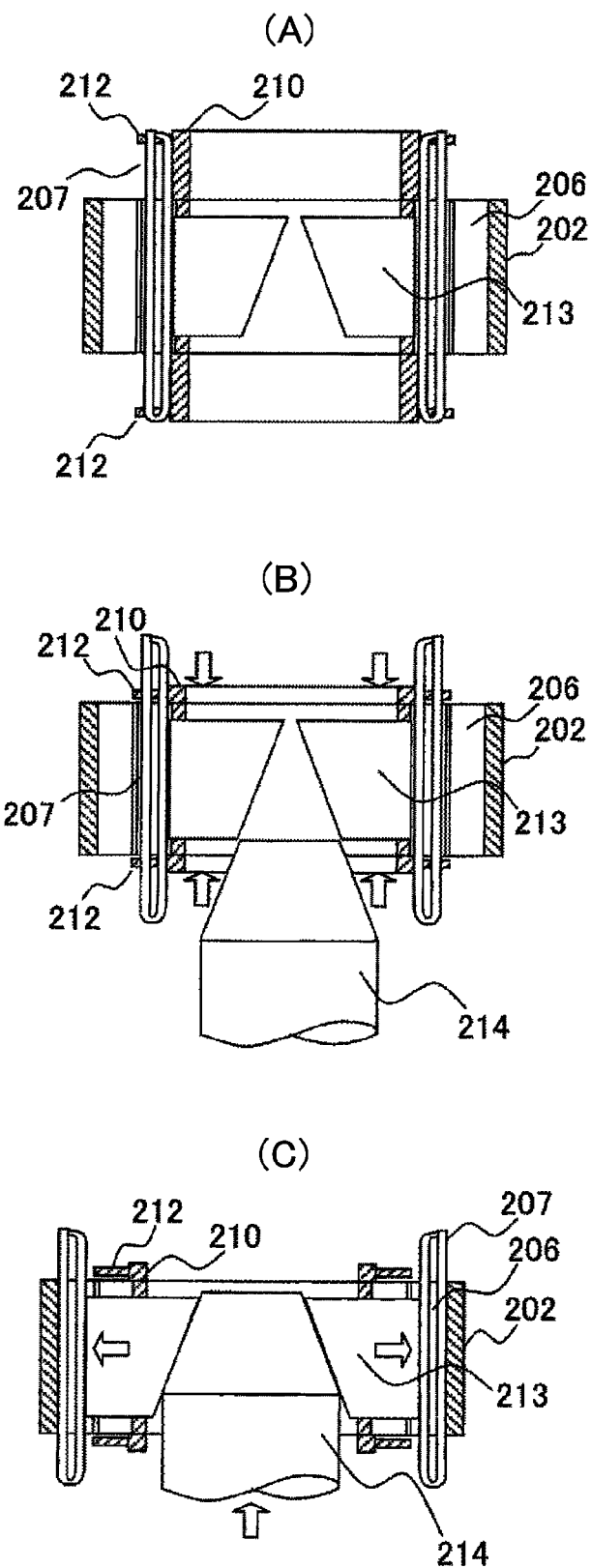
FIG. 6 is a diagram showing a step of assembling the distributed winding coil according to the embodiment of the present invention.

FIG. 6 is a diagram of a step of assembling the distributed winding coil 207 for one phase in the stator core 202. FIG. 6(A) shows that the coil 207 comprising the wire distributively wound around the reel 210, as a whole, is placed inside the stator core 202. The distributed winding coil 207 is wound around each of the winding wire pins 212 arranged at the upper and lower positions on the reel 210. Furthermore, the insertion blades 213 are arranged on the reel 210 to allow the distributed winding coil 207 into the stator core slot 206. FIG. 6(B) shows that the axial height position of the winding wire pins 212 is lowered, the winding wire pins 212 are removed from the distributed winding coil 207, and a pressurization rod 214 is placed in order to move the insertion blades 213. FIG. 6(C) shows that the pressurization rod 214 is raised to move the insertion blades 213 in the radial direction, thus inserting the distributed winding coil 207 into the stator core slot 206 in the stator core 202. This operation is repeated as shown in FIGS. 2 to 4 to assemble a predetermined number of coils for predetermined phases to form a stator.

Figure 7:
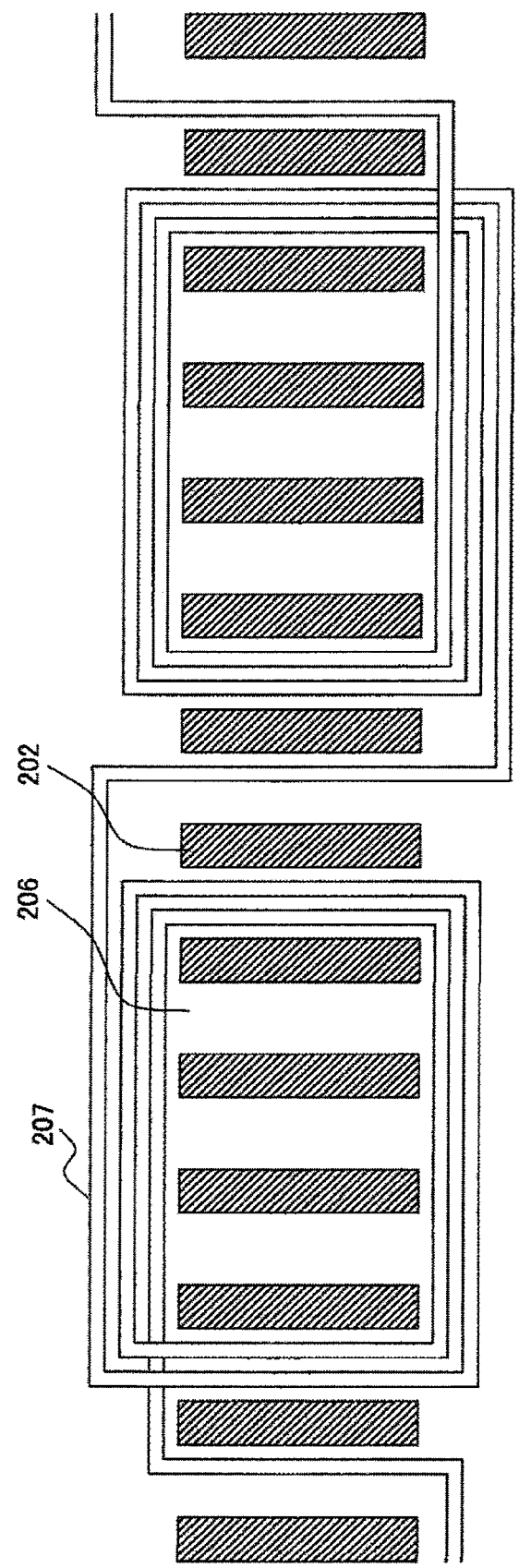
FIG. 7 is a development showing a distributed winding wire path according to the embodiment of the present invention.

FIG. 7 is an example of a development showing a winding wire path for the distributed winding coil 207. The reel can be formed such that the coil is wound through the stator core slot 206 in the stator core 202 along the path shown in FIG. 7. Based on the reel and the winding wire path, the distributed winding coil 207 can be wound using a winding wire path other than that according to the present embodiment.

Figure 8:
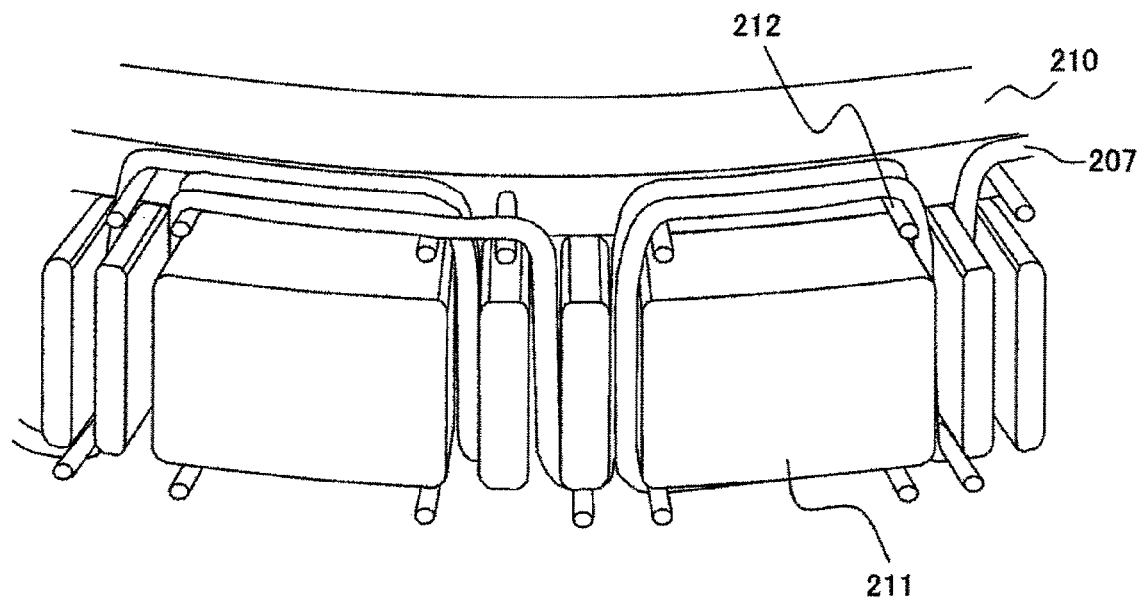
FIG. 8 is a perspective view of the reel around which the distributed winding coil according to the embodiment of the present invention is wound.

FIG. 8 is a partly enlarged perspective view showing a part of the reel 210 around which the wire is wound along the winding wire path shown in FIG. 7. The winding wire protruding portions 211 are circumferentially arranged on the reel 210. The winding wire pin 212 is located over and under each of the winding wire protruding portions. The wire is wound around each of the winding wire protruding portions 211 and each of the winding wire pins 212 so as to form a predetermined shape shown in FIG. 7. Thus, the distributed winding coil 207 is formed. This operation is repeated as shown in FIGS. 2 to 4 to assemble a predetermined number of coils for predetermined phases to form a stator.

The distributed winding coil will be described in detail with reference to FIGS. 9 and 10.

Figure 9:
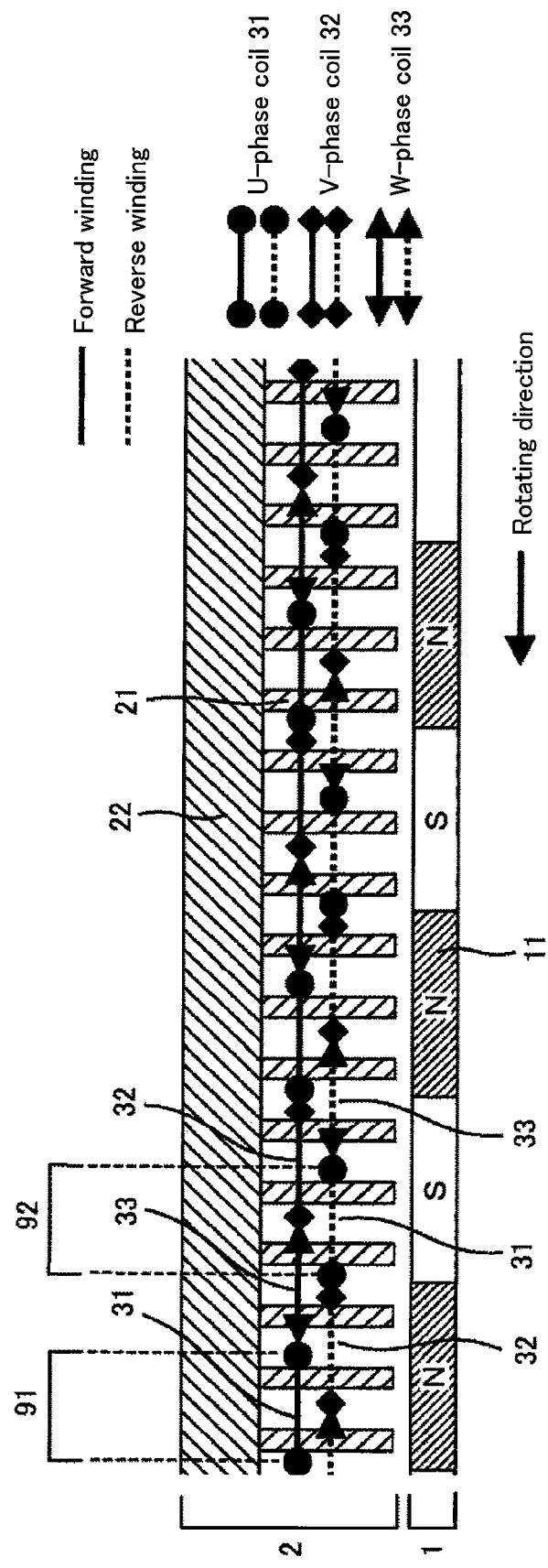
FIG. 9 is a conceptual diagram of a rotating electrical machine in an example of the present invention.

FIG. 9 is a conceptual diagram of a rotating electrical machine in an example of the present invention. FIG. 9 is a linear development of a part of the rotating electrical machine.

The rotating electrical machine comprises the rotor 1 and the stator 2. A plurality of rotor magnetic poles 11 are installed in the rotor 1. A plurality of teeth are installed on the stator 2 so as to form magnetic poles of the stator. A U-phase coil 31, a V-phase coil 32, and a W-phase coil 33 are wound around the plurality of teeth 21. Here, the V-phase coil is defined to have a 120-degree phase lag (240-degree phase lead) with respect to an alternating current flowing through the U-phase coil. Furthermore, the W-phase coil is defined to have a 240-degree phase lag (120-degree phase lead) with respect to an alternating current flowing through the U-phase coil. The rotating direction of the rotor 1 is shown by an arrow in the figures.

Figure 10:
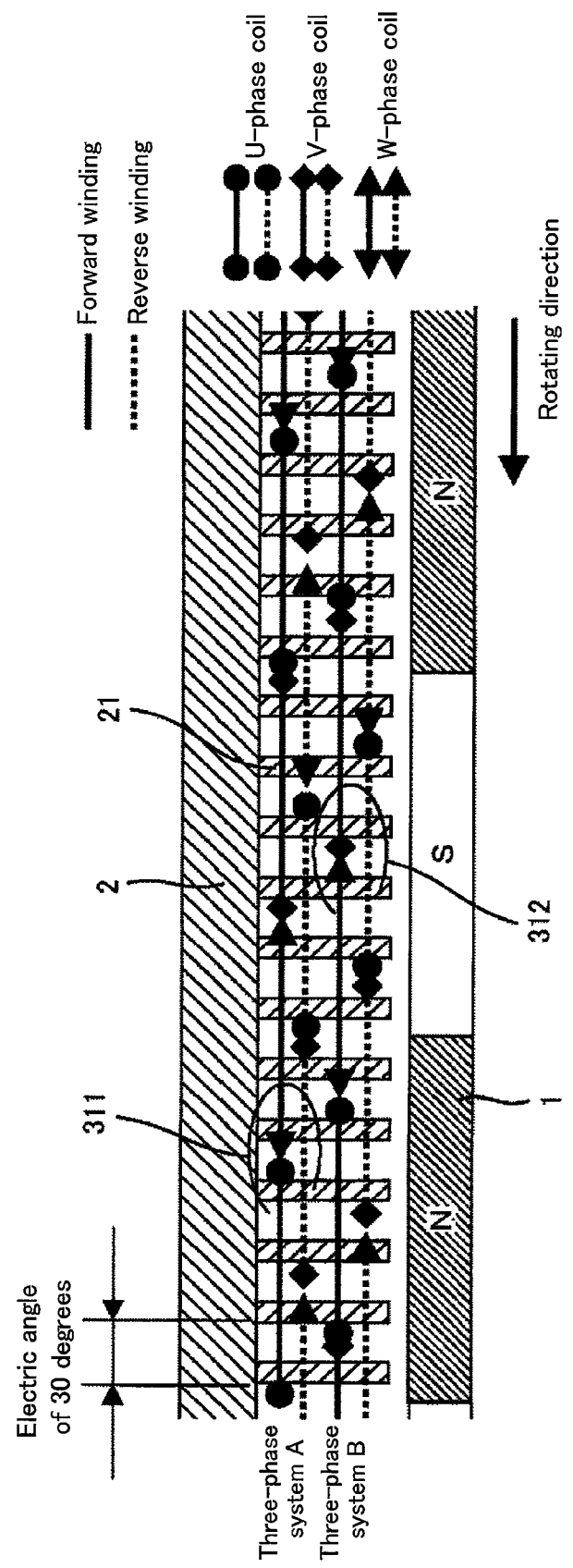
FIG. 10 is a conceptual diagram of a rotating electrical machine in an example of the present invention.

In FIGS. 9 and 10, solid lines mean that the coil is wound forward (clockwise as the teeth are seen from the inner diameter side thereof). Dotted lines mean that the coil is reversely wound (counterclockwise as the teeth are seen from the inner diameter side thereof). FIG. 1 shows that the forward wound coil is wound away from the rotor. However, the forward wound coil is wound close to the rotor. As shown in FIGS. 9 and 10, in the stator coil structure in the present example, two concentrated winding coils are doubly arranged so as to be displaced from each other by an electric angle of 180 degrees. The U-phase coil, the V-phase coil, and the W-phase coil are connected together in series. In other words, the rotating electrical machine is configured as follows. The stator 2 is placed on the rotor 1 via a void. The coil is wound such that two stator magnetic poles 91 and 92 each formed of in-phase coil turns are arranged within an electric angle range of 360 degrees. The coil turns forming the stator magnetic poles, 91 and 92 have a circumferential angle range smaller than the electric angle of 180 degrees and are provided so as not to overlap each other. The coil turns are wound such that the individual stator magnetic poles 91 and 92 have opposite magnetic properties. Here, the coil turns forming the two stator magnetic poles 91 and 92 are displaced from each other by an electric angle of 180 degrees. The stator magnetic poles for the three phases U, V, and W are constructed and arranged so as to be displaced from one another by an electric angle of 60 degrees. The V-phase coil is wound in the direction reverse to that in which the U-phase coil is wound. Since +60 degrees−180 degrees=−120 degrees, the V-phase coil has a 120-degree phase lag with respect to the U-phase coil. Furthermore, the W-phase coil is wound in the same direction as that in which the U-phase coil is wound. Thus, the W-phase coil has a 120-degree (=2×60 degrees) phase lead with respect to the U-phase coil. Additionally, in the present example, one coil turn forms an electric angle range of 120 degrees. Two in-phase coil turns are wound around a region corresponding to an electric angle of 240 degrees, that is, around two-thirds of the total number of teeth. This coil winding is hereinafter referred to as distributed winding.

Thus, in the stator coil in the present example, the coil turns, interlinked with magnetic fluxes from the rotor, have a circuit area twice as large as that in the concentrated winding structure, in which one concentrated winding coil is provided within an electric angle of 360 degrees. Furthermore, coil utilization efficiency is twice as high as that in the concentrated winding structure. If a certain tooth is focused on, the number of coil turns required to be wound around the tooth to obtain the same interlinkage magnetic flux as that in the concentrated winding is only half that required for the concentrated winding. Each of the U-, V-, and W-phase coils is distributed to a degree twice as great as that in the concentrated winding. Moreover, compared to the coils in the distributed winding, which is wound around all the teeth, the coils in the present example are wound around only two-thirds of the total number of teeth. Thus, the present example enables a reduction in coil inductance compared to the concentrated winding or the distributed winding.

Moreover, in the present example, the coil is distributed to a degree twice as great as that in the concentrated winding. Furthermore, about half of each of the U-, V-, and W-phase coils is overlappingly wound. Hence, armature reaction is relatively smoothly distributed in the circumferential direction compared to that in the concentrated winding. As a result, high-order electromagnetic-force harmonic components are reduced. Thus, the present rotating electrical machine can function more quietly than in the case of the concentrated winding.

The example in FIG. 9 corresponds to the structure in which the stator teeth are arranged at electric angular intervals of 60 degrees and in which the coil turns are wound at an electric angle range of 120 degrees. However, similar effects can be exerted even when the stator teeth are arranged at electric angular intervals of 30 degrees and the coil turns are wound at an electric angle range of 90, 120, or 150 degrees.

FIG. 10 is a conceptual diagram of a rotating electrical machine in an example of the present invention. The present example is similar to that described above except for the following.

The present example is a structure corresponding to a combination of the above-described distributed winding structure and a double three-phase structure. That is, two winding wire groups as shown in FIG. 9 are arranged such that the phases of the winding wire groups are displaced from each other. As shown in FIG. 10, in this configuration, 12 teeth are provided for every 360 degrees of electric angle so as to set the difference in electric angle phase between the adjacent teeth 21 to 30 degrees. A three-phase AC system coil for a distributed winding structure of one three-phase AC system (three-phase system A) is located on the radially outside of each of the teeth 21. A three-phase AC system coil for a distributed winding structure of another three-phase AC system (three-phase system B) is located on the radially inside of each of the teeth 21. The three-phase system B is displaced from the three-phase system A by an electric angle of 30 degrees and connected in parallel with the three-phase system A. In each of the three-phase systems A and B, each coil is wound so as to bundle four teeth together.

Figure 11:
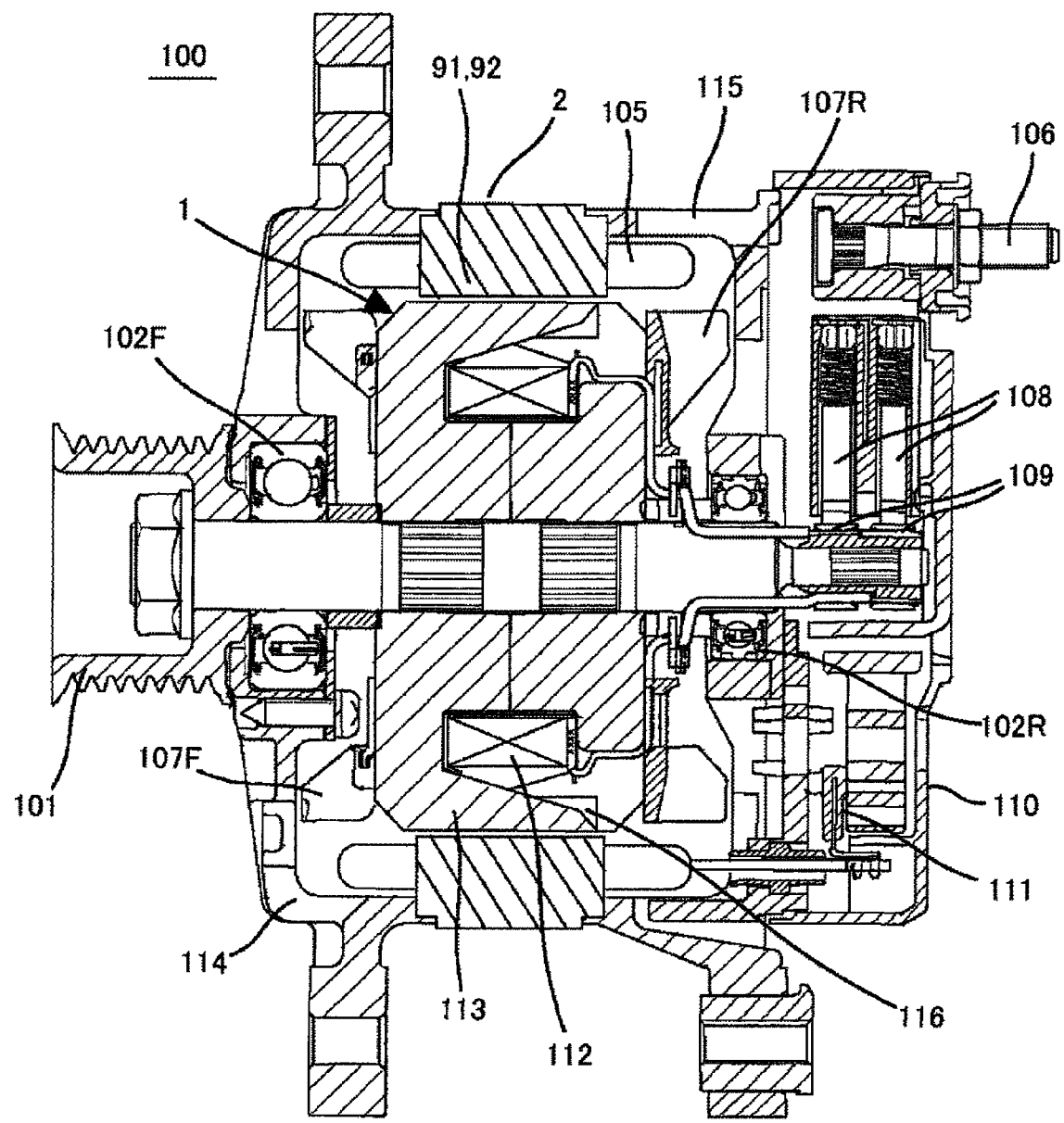
FIG. 11 is a sectional view of an air-cooled AC dynamo on vehicle 100 in an example of the present invention.

FIG. 11 is a sectional view of an air-cooled AC dynamo 100 on vehicle. In a rotor 1, a pawl-like magnetic pole 113 is located on a central portion of a shaft. A field winding wire 112 is located in a central portion of the pawl-like magnetic pole 113. A pulley 101 is attached to the leading end of the shaft. A slip ring 109 is provided on the opposite side of the pulley 101 to feed electricity to the field winding wire. Moreover, a front fan 107F and a rear fan 107R of a cooling fan configured to rotate in synchronism with rotation of the rotor are provided on the respective opposite end surfaces of the pawl-like magnetic pole 113. Furthermore, a permanent magnet 116 is located on the pawl-like magnetic pole 113 to serve as auxiliary excitation to increase magnetic fluxes from the field winding wire. On the other hand, a stator 2 comprises stator magnetic poles 91 and 92 and a stator winding wire. The stator 2 is located opposite the rotor 1 via a small gap. The stator 2 is held by a front bracket 114 and a rear bracket 115. Both brackets and the rotor 1 are rotatably supported by bearings 102F and 102R. Upon coming into contact with a brush 108, the above-described slip ring 109 is fed with electricity. The stator winding wire comprises winding wires for three phases as is the case with the above-described example. The lead wire of each winding wire is connected to a rectification circuit 111. The rectification circuit 111 comprises a rectification element such as a diode and forms a full-wave rectification circuit. In the case of, for example, a diode, a cathode terminal is connected to a terminal 106. Furthermore, an anode-side terminal is electrically connected to the main body of the dynamo on vehicle. A rear cover 110 serves as a protect cover for the rectification circuit 111.

Now, a generation operation will be described. An engine (not shown in the drawings) and the AC dynamo on vehicle 100 are generally coupled together via a belt. The AC dynamo on vehicle 100 is connected to the engine via the belt using the pulley 101 so that the rotor 1 rotates in conjunction with rotation of the engine. A current flows through the field winding wire 112 provided in the central portion of the pawl-like magnetic pole 113 of the rotor 1, to magnetize the pawl-like magnetic pole 113. Then, the rotor 1 rotates to generate a three-phase induced electromotive force in the stator winding wire. The voltage of the induced electromotive force is subjected to full-wave rectification by the above-described rectification circuit 111. Thus, a DC voltage is generated. The plus side of the DC voltage is connected to the terminal 106 and further to a battery (not shown in the drawings). Although detailed descriptions are omitted, the field current is controlled so as to make the rectified DC voltage suitable for charging the battery.

Figure 12:
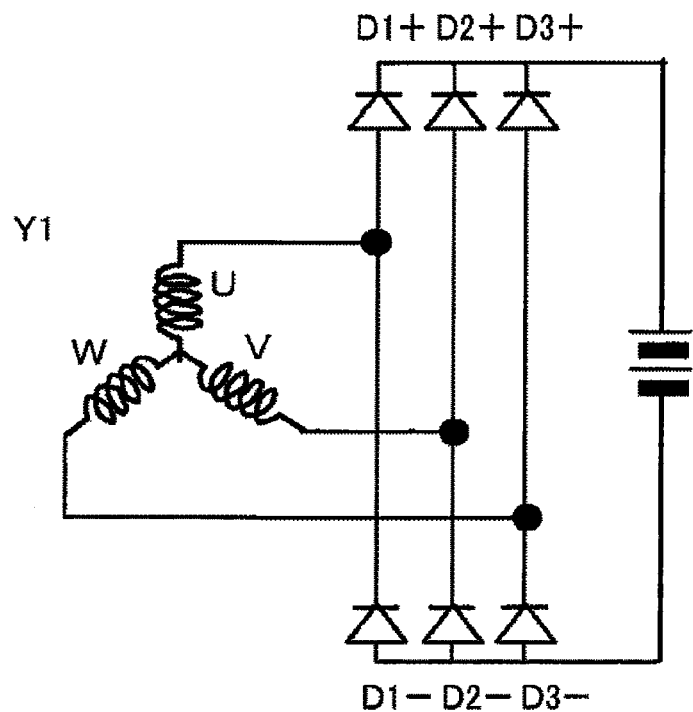
FIG. 12 is a diagram showing a three-phase rectification circuit comprising the winding wires shown in FIG. 11.
Figure 12:
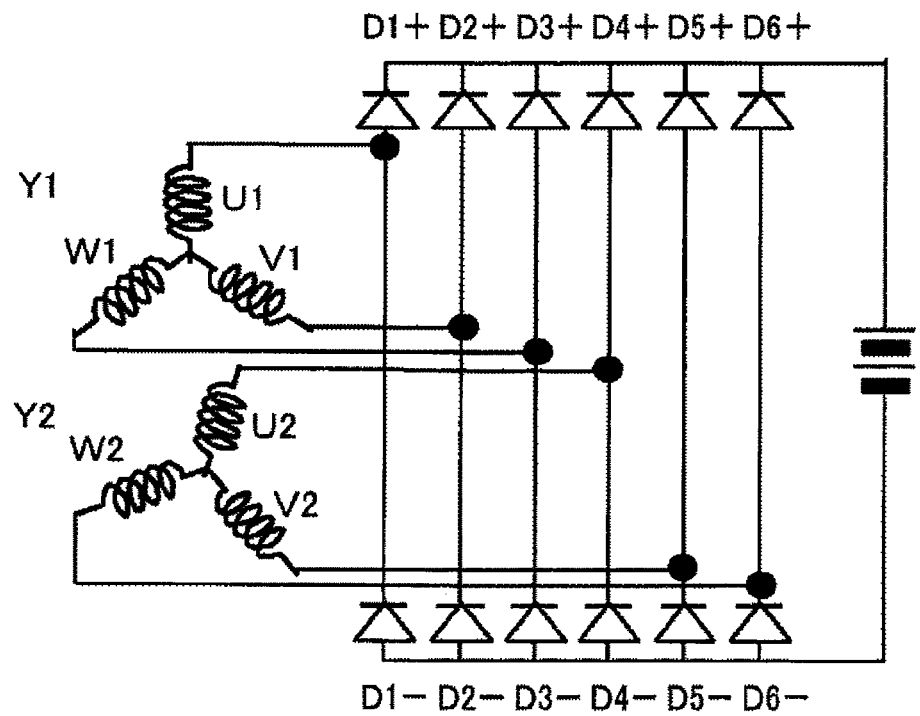

FIG. 12 shows the three-phase rectification circuit shown in FIG. 11 and comprising winding wires. FIG. 12(A) corresponds to the example shown in FIG. 9. FIG. 12(B) corresponds to the example shown in FIG. 10. The winding wires for the respective phases are connected together by three-phase Y connection. Anti-neutral point-side terminals of the coils for the three phases are connected to six diodes D1+ to D3− as shown in FIG. 12. Furthermore, the cathodes of the plus-side diodes are all connected to the plus side of the battery. Similarly, the anodes of the minus-side diode terminals are all connected to minus side of the battery.

In FIG. 12(B), winding wires U1 and U2 included in electrically independent three-phase winding wires have an equal voltage and electrical phases displaced from each other by 30 degrees. Thus, portions with high potentials are selected, resulting in a ripple with an angle range of 30 degrees.

The star connection has been illustrated. However, delta connection may be adopted. Compared to the star connection, the delta connection allows the coil induced electromotive force to be effectively increased by 11.5%.

In other words, the above-described examples correspond to a rotating electrical machine comprising a stator including stator coils through which a current based on a single three-phase AC system flows, teeth around which the stator coil is wound, and a core back configured to return a magnetic flux flowing through the teeth, and a rotor including magnetic poles opposite the teeth, wherein the stator coils wound around the teeth are only a U-phase coil and a V-phase coil, the V-phase coil and a W-phase coil, or the W- and U-phase coils.

Alternatively, the above-described examples correspond to a rotating electrical machine comprising a stator including stator coils through which a current based on a single three-phase AC system flows, teeth around which the stator coil is wound, and a core back configured to return a magnetic flux flowing through the teeth, and a rotor including magnetic poles opposite the teeth, wherein a concentrated winding coil system with a U-phase coil, a V-phase coil, and a W-phase coil is located at a radially outside position of each of the teeth, a concentrated winding coil system including a U-phase coil, a V-phase coil, and a W-phase coil and wound reversely to the above-described concentrated winding coil system is located at a radially inside position of each of the teeth, and the two concentrated winding coil systems are connected in series for each phase.

Alternatively, the above-described example is a rotating electrical machine comprising two three-phase coil systems each formed of a U-phase coil, a V-phase coil, and a W-phase coil, wherein the electric angle phase difference of each of the coil systems is set to substantially 30 degrees or to between 20 degrees and 40 degrees.

What is claimed is:

1. A process of manufacture of a rotating electrical machine, including a rotor provided with a plurality of magnetic poles in a circumferential direction and a stator placed on the rotor via a void, the stator comprising two in-phase stator magnetic poles, each formed of teeth, a first coil turn, and a second coil turn, which is connected in series with the first coil turn and has a magnetic property opposite to that of the first coil turn, arranged within an electric angle of 360 degrees formed by magnetic poles of the rotor, the first coil turn and the second coil turn being wound such that they each have a circumferential angle range smaller than an electric angle of 180 degrees, and teeth forming a part of an out-of-phase stator magnetic pole being provided between the first coil turn and the second coil turn, the process comprising:

manufacturing the stator by:
a first step of placing the first coil turn and the second coil turn comprising a wire wound around a reel, as a whole, inside a stator core;
a second step of moving an insertion blade so as to spread the first coil turn and the second coil turn in a radial direction of the stator core, thus inserting the first coil turn and the second coil turn into a stator core slot formed to the stator; and
a third step of winding the wire around winding wire protruding portions and winding wire pins so as to form a distributed winding coil, while the winding wire protruding portions are circumferentially arranged on the reel, and the winding wire pin is placed over and under each of the winding wire protruding portions; and
after completion of the third step, further performing a fourth step of lowering an axial height position of the winding wire pins to remove the winding wire pins from the distributed winding coil and raising a pressurization rod to move the insertion blade in a radial direction to insert the distributed winding coil into the stator core slot.

2. The process of manufacture of a rotating electrical machine according to claim 1, wherein the stator is manufactured by repeating the first step and the second step for a plurality of times to insert winding wires for a plurality of phases into the stator core slot.

* * * * *